(12) United States Patent
Aoki et al.

(10) Patent No.: US 7,034,978 B2
(45) Date of Patent: Apr. 25, 2006

(54) OPTICAL FUNCTION DEVICE USING PHOTONIC CRYSTAL, VARIABLE WAVELENGTH OPTICAL FILTER AND VARIABLE WAVELENGTH LIGHT SOURCE

(75) Inventors: Tsuyoshi Aoki, Kawasaki (JP);
Kazuaki Kurihara, Kawasaki (JP);
Makoto Kuwabara, Tokyo (JP)

(73) Assignees: Fujitsu Limited, Kawasaki (JP); Japan as represented by the President of The University of Tokyo, Tokyo (JP)

( * ) Notice: Subject to any disclaimer, the term of this patent is extended or adjusted under 35 U.S.C. 154(b) by 0 days.

(21) Appl. No.: 10/804,061

(22) Filed: Mar. 19, 2004

(65) Prior Publication Data
US 2004/0184752 A1   Sep. 23, 2004

(30) Foreign Application Priority Data
Mar. 20, 2003   (JP) .............................. 2003-077750

(51) Int. Cl.
*G03F 1/03*   (2006.01)
(52) U.S. Cl. ................................ 359/245
(58) Field of Classification Search ................ 359/245, 359/237, 248, 250, 577, 587, 588, 578
See application file for complete search history.

(56) References Cited

U.S. PATENT DOCUMENTS

| | | | |
|---|---|---|---|
| 5,739,796 A * | 4/1998 | Jasper et al. ................. 343/895 |
| 5,887,089 A * | 3/1999 | Deacon et al. ................. 385/22 |
| 6,567,573 B1 * | 5/2003 | Domash et al. ................ 385/16 |
| 6,798,960 B1 * | 9/2004 | Hamada ....................... 385/122 |
| 2003/0063884 A1 * | 4/2003 | Smith et al. .................. 385/129 |

FOREIGN PATENT DOCUMENTS

JP   3-286587   12/1991

* cited by examiner

*Primary Examiner*—Hung Dang
*Assistant Examiner*—Tuyen Tra
(74) *Attorney, Agent, or Firm*—Armstrong, Kratz, Quintos, Hanson & Brooks, LLP

(57) ABSTRACT

A core layer contains photonic crystals formed by ferroelectric members made of a ferroelectric substance and periodically disposed along a one-dimensional direction or two-dimensional directions. Electrodes apply an electric field to the core layer. An optical function device is provided which can be made compact and can set a wavelength at high speed.

25 Claims, 17 Drawing Sheets

OPTICAL FUNCTION DEVICE USING PHOTONIC CRYSTAL, VARIABLE WAVELENGTH OPTICAL FILTER AND VARIABLE WAVELENGTH LIGHT SOURCE

CROSS REFERENCE TO RELATED APPLICATION

This application is based on and claims priority of Japanese Patent Application No. 2003-77750 filed on Mar. 20, 2003, the entire contents of which are incorporated herein by reference.

BACKGROUND OF THE INVENTION

A) Field of the Invention

The present invention relates to an optical function device using photonic crystals, a variable wavelength optical filter and a variable wavelength light source.

B) Description of the Related Art

Tremendous recent spread of the Internet is increasing the number of channels of transmission apparatuses supporting backbone networks. It has been desired to broaden the wavelength band of wavelength division multiplexing (WDM) and shorten an interval between signal wavelengths. A laser light source for a WDM communication system now used has a plurality of juxtaposed semiconductor lasers at different oscillation wavelengths.

A variable wavelength laser light source can be structured by a combination of a laser oscillator having no wavelength selectivity and a variable wavelength optical filter. A variable wavelength optical filter can be realized by a Fabry-Perot resonator having a pair of reflection mirrors whose distance can be changed.

Related art is described in Japanese Patent Laid-open Publication No. HEI-3-286587.

A laser light source having a plurality of juxtaposed semiconductor lasers is bulky and difficult to reduce the size. A variable wavelength optical filter realized by a Fabry-Perot resonator is required to mechanically move the reflection mirror and is difficult to speed up wavelength setting.

SUMMARY OF THE INVENTION

An object of this invention is to provide an optical function device capable of reducing the size and speeding up wavelength setting, a variable wavelength optical filter and a variable wavelength light source.

According to one aspect of the present invention, there is provided an optical function device comprising: a core layer containing photonic crystals formed by ferroelectric members made of a ferroelectric substance and periodically disposed along a one-dimensional direction or two-dimensional directions; and electrodes for applying an electric field to the core layer.

As an electric field is applied to the core layer, a refractive index of the ferroelectric members changes. The photonic band structure of photonic crystals changes accordingly.

According to another aspect of the present invention, there is provided a variable wavelength optical filter, comprising: a first optical filter; and a second optical filter upon which a laser beam transmitted through the first optical filter becomes incident, wherein each of the first and second optical filters comprises: a core layer containing photonic crystals formed by ferroelectric members made of a ferroelectric substance and periodically disposed along a one-dimensional direction or two-dimensional directions; and electrodes for applying an electric field to the core layer, and wherein band gaps of the photonic crystals of the first and second optical filters are apart from each other by a wavelength interval.

By applying an electric field to the core layer, the band gaps of photonic crystals of the first and second optical filters can be shifted. Light having a wavelength between the band gaps of the first and second optical filters transmits through the serially connected two optical filters. By controlling the electric filed, the wavelength of transmission light can be changed.

According to still another aspect of the present invention, there is provided an optical function device comprising: a core layer including a first member disposed periodically along a one-dimensional direction or two-dimensional directions and a second member filled in between the first members, the first and second members constituting a photonic crystal, and at least one of the first and second members being made of a substance having a character that a refractive index is changed upon generation of an electric field; and electrodes for applying an electric field to the core layer.

As an electric field is applied to the core layer, a refractive index of at least one of the first and second members changes. The photonic band structure of photonic crystals changes accordingly.

According to still another aspect of the present invention, there is provided a variable wavelength optical filter comprising: a first optical filter, and a second optical filter upon which a laser beam transmitted through the first optical filter becomes incident, wherein each of the first and second optical filters comprises: a core layer including a first member disposed periodically along a one-dimensional direction or two-dimensional directions and a second member filled in between the first members, the first and second members constituting a photonic crystal, and at least one of the first and second members being made of a substance having a character that a refractive index is changed upon generation of an electric field; and electrodes for applying an electric field to the core layer, and wherein band gaps of the photonic crystals of the first and second optical filters are apart from each other by a wavelength interval.

By applying an electric filed to the core layer, it is possible to shift the band gaps of photonic crystals of the first and second optical filters. Light having a wavelength between the band gaps of the first and second optical filters transmits through the serially connected two optical filters. By controlling the electric filed, the wavelength of transmission light can be changed.

As above, it is possible to obtain an optical function device capable of changing a transmission wavelength at high speed.

DESCRIPTION OF THE PREFERRED EMBODIMENTS

Figure 1:
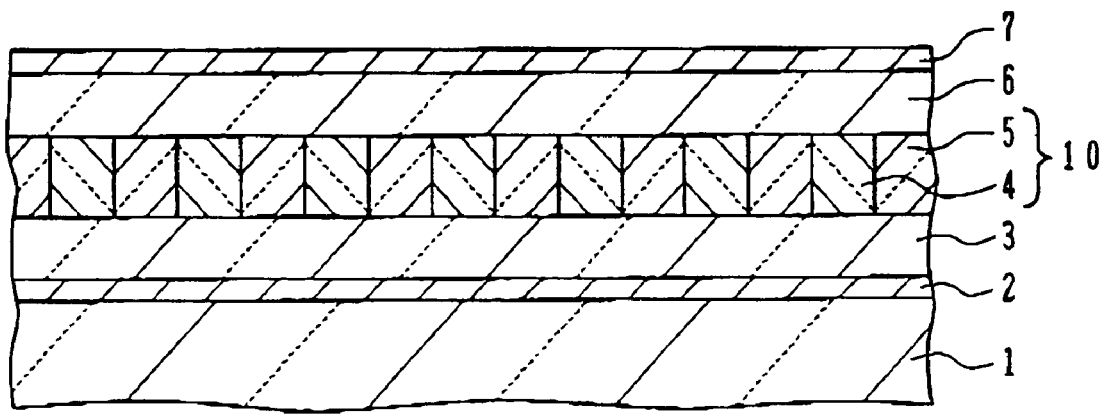
FIG. 1 is a cross sectional view of an optical function device according to a first embodiment.

FIG. 1 is a cross sectional view of an optical function device according to the first embodiment of the invention. On a single crystal substrate 1 of $SrTiO_3$ (STO) having an exposed (001) plane, a lower electrode 2 is formed having a thickness of 200 nm. A single crystal oxide substrate such as $LaAlO_3$ and MgO may be used as the single crystal substrate 1. The lower electrode 2 is made of, for example, metal such as platinum (Pt) or conductive oxide such as $SrRuO_3$ (SRO).

On the lower electrode 2, a lower clad layer 3 is formed which is made of MgO and has a thickness of 1 μm. On the lower clad layer 3, a core layer 10 of 2 μm in thickness is formed. The core layer 10 is made of ferroelectric columns 4 made of ferroelectric substance and a filler 5. The ferroelectric columns 4 have a cylindrical shape and are disposed on the surface of the lower clad layer 3 periodically along the two-dimensional directions. For example, the ferroelectric columns are disposed at positions corresponding to the apexes of equilateral triangles (cross points of triangular lattice) covering the plane of the lower clad layer 3 without any gap. The ferroelectric substance may be (Pb, La)(Zr, Ti)$O_3$ (PLZT (9/65135)). The filler 5 is made of, for example, $TiO_2$ and filled in between the ferroelectric columns 4.

On the core layer 10, an upper clad layer 6 is formed which is made of MgO and has a thickness of 1 μm. On the upper clad layer 6, an upper electrode 7 is formed which is made of metal such as Pt or conductive oxide such as SRO and has a thickness of 200 nm. An effective refractive index of the core layer 10 is higher than refractive indices of the lower clad layer 3 and upper clad layer 6.

With reference to FIGS. 2A to 2D, description will be made on a method of manufacturing the optical function device of the first embodiment.

Figure 2A:
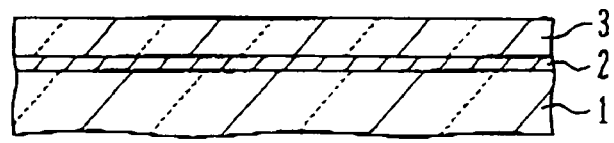
FIGS. 2A to 2D are cross sectional views illustrating a manufacture method for the optical function device of the first embodiment.

As shown in FIG. 2A, on a substrate 1 made of STO and having an exposed (001) plane, a lower electrode 2 made of Pt, SRO or the like and having a thickness of 200 nm is formed by sputtering. On the lower electrode 2, a lower clad layer 3 is formed by sputtering, the lower clad layer 3 being made of MgO and having a thickness of 1 μm.

Figure 2B:
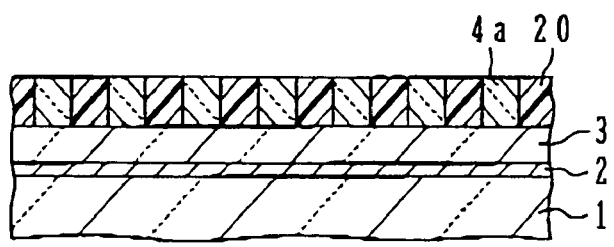

As shown in FIG. 2B, on the lower clad layer 3, a resist pattern 20 is formed having a thickness of 2 μm. The resist pattern 20 is formed by coating electron beam exposure resist, directly drawing a pattern with an electron beam and developing it The resist pattern 20 is formed with through holes corresponding to the ferroelectric columns 4 shown in FIG. 1. PLZT sol 15 precursor solution is filled in the through holes formed through the resist pattern 20, and dried to form PLZT precursors 4a.

Figure 2C:
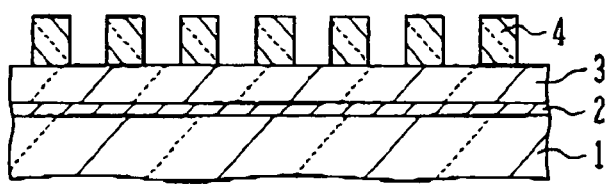

As shown in FIG. 2C, the resist pattern 20 is removed. The PLZT precursors 4a are baked to form ferroelectric columns 4 made of PLZT single crystals and having a height of 2 μm.

If it is difficult to single-crystallize the ferroelectric columns having a height of 2 μm, it is preferable to perform a plurality of times the processes of forming a resist pattern, filling PLZT sol precursor solution, removing the resist pattern and baking.

For example, a resist pattern having a thickness of 600 nm is formed, PLZT sol precursor solution is filled, the resist pattern is removed and the PLZT precursors are baked to form ferroelectric columns having a height of 600 nm. If the height of the ferroelectric columns made of PLZT is 600 nm, PLZT crystals can be epitaxially grown on the underlying lower clad layer 3 by baking the ferroelectric columns at 725° C. for 10 minutes. This procedure is repeated three times so that single crystal ferroelectric columns having a height of 1.8 μm can be formed.

A thickness of a resist pattern to be formed at the second time is set to 1200 nm, and a thickness of a resist pattern to be formed at the third time is set to 1800 nm. Namely, a thickness from the upper surfaces of the formed ferroelectric columns to the upper surface of the newly formed resist pattern is set to 600 nm. If the upper surface of the resist film is irregular due to the underlying ferroelectric columns, the upper surface is planarized before exposure.

Thereafter, a resist pattern having a height of 2 μm is formed and ferroelectric columns having a height of 0.2 μm are stacked to form the ferroelectric columns 4 having a height of 2 μm. Through holes to be formed through each resist pattern are formed all at the same positions.

Figure 3A:
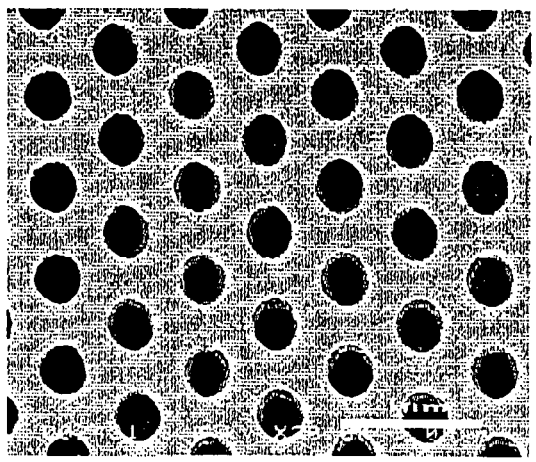
FIGS. 3A to 3D are SEM photographs showing ferroelectric columns constituting photonic crystals of the optical function device of the first embodiment.
Figure 3B:
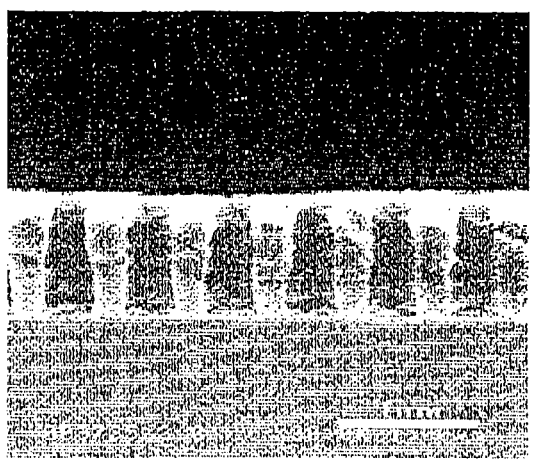
Figure 3C:
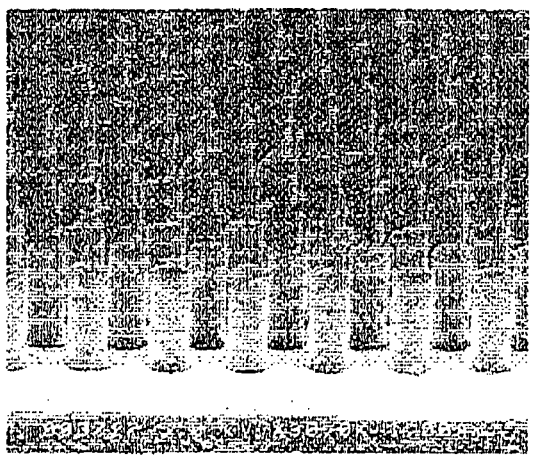
Figure 3D:
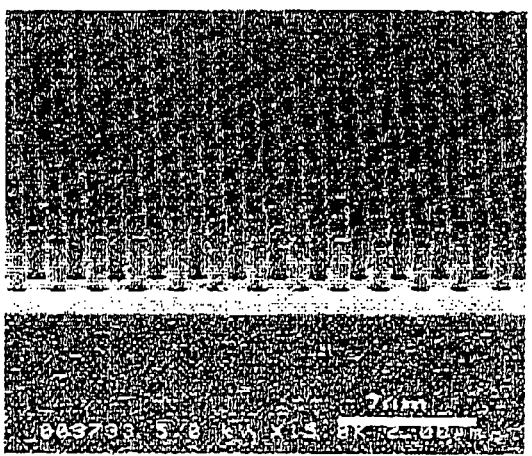

FIGS. 3A and 3B are scanning electron microscope (SEM) photographs of the resist pattern, and FIGS. 3C and 3D are SEM photographs of the ferroelectric columns 4 actually manufactured. FIG. 3A is a plan photograph, FIG. 3B is a cross sectional photograph, and FIGS. 3C and 3D are photographs taken obliquely relative to the substrate surface. A height of the ferroelectric column is about 600 nm and its diameter is 300 nm. One side of an equilateral triangle defined by coupling the centers of three adjacent ferroelectric columns shown in the plan photograph of FIG. 3A has a length of about 600 nm. It can be seen that a number of ferroelectric columns are disposed periodically.

Figure 2D:
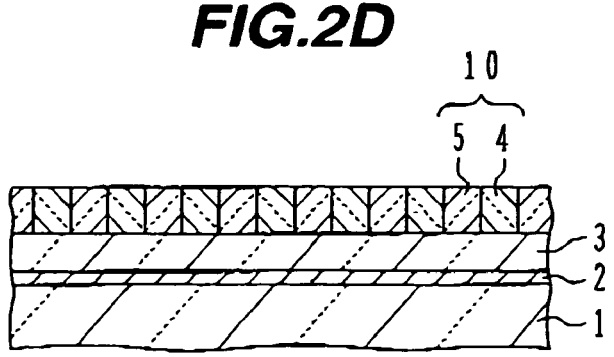

As shown in FIG. 2D, a filler 5 made of STO or the like is filled in between the ferroelectric columns 4. For example, the filler 5 is formed by depositing an STO film by sputtering and thereafter removing an unnecessary STO film by chemical mechanical polishing (CMP). The upper surfaces of the ferroelectric columns 4 and filler 5 are therefore made flush. A core layer 10 is therefore formed which has the ferroelectric columns 4 periodically distributed in the filler 5.

On the core layer 10, an upper clad layer 6 is formed by sputtering as shown in FIG. 1, the upper clad layer 6 being made of MgO and having a thickness of 1 µm On the upper clad layer 6, an upper electrode 7 made of Pt, SRO or the like and having a thickness of 200 nm is formed by sputtering.

The core layer 10 of the optical function device of the first embodiment functions as photonic crystals. The photonic crystal has a photonic band structure and will not transmit light having a wavelength in the band gap. The band gap is dependent upon the refractive indices of the ferroelectric columns 4 and filler 5 and the alignment period of the ferroelectric columns 4 periodically disposed.

Figure 4:
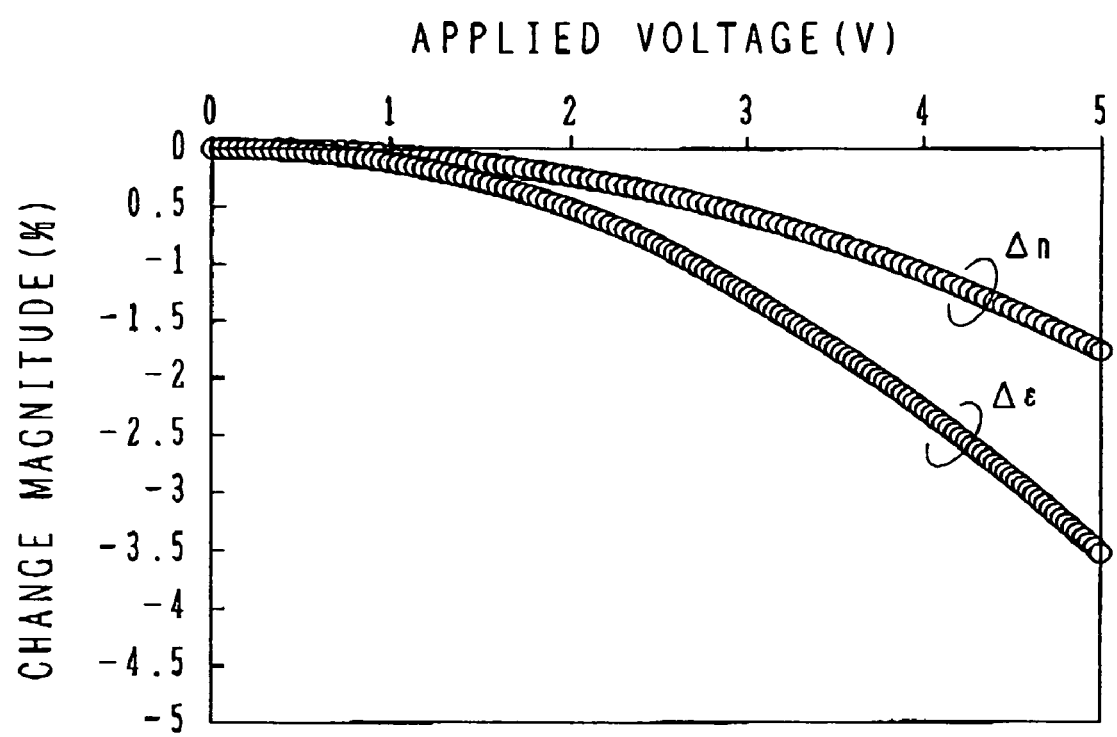
FIG. 4 is a graph showing the relation between an applied voltage, and a change amount in a refractive index and a dielectric constant of PLZT.

FIG. 4 shows the relation between an applied voltage, and a change amount in a refractive index and a dielectric constant of PLZT. The abscissa represents an applied voltage in the unit of "V" and the ordinate represents a change amount in a physical quantity in the unit of "%". The applied voltage is a voltage applied across both end faces of ferroelectric columns made of PLZT and having a height of 2 µm. As voltage is applied, an electric field is generated along the height direction of the ferroelectric columns so that a refractive index changes due to the electrooptical effect. In FIG. 4, symbols Δn and Δ∈ represent change amounts in the refractive index and dielectric constant, respectively.

The change amount in the refractive index was calculated by the calculation formula described in "Hot-Pressed (Pb, La)(Zr, Ti)$O_3$ Ferroelectric Ceramics for Electrooptic Applications" by G. H. HAERTLING and C. E. LAND, Journal of the American Ceramic Society, Vol. 54, No. 1, Page 1.

As seen from FIG. 4, as the applied voltage is raised, the refractive index and dielectric constant lower. As the refractive index of the ferroelectric columns 4 shown in FIG. 1 changes, the band gap of the core layer 10 displaces (shifts). Namely, the wavelength range changes in which range light will not transmit through the core layer 10. In order to increase the refractive index change amount, it is preferable to form the ferroelectric columns by using PLZT oriented to have the height direction (thickness direction of the core layer 10) of the ferroelectric columns as the polarization axis (c axis).

Figure 5A:
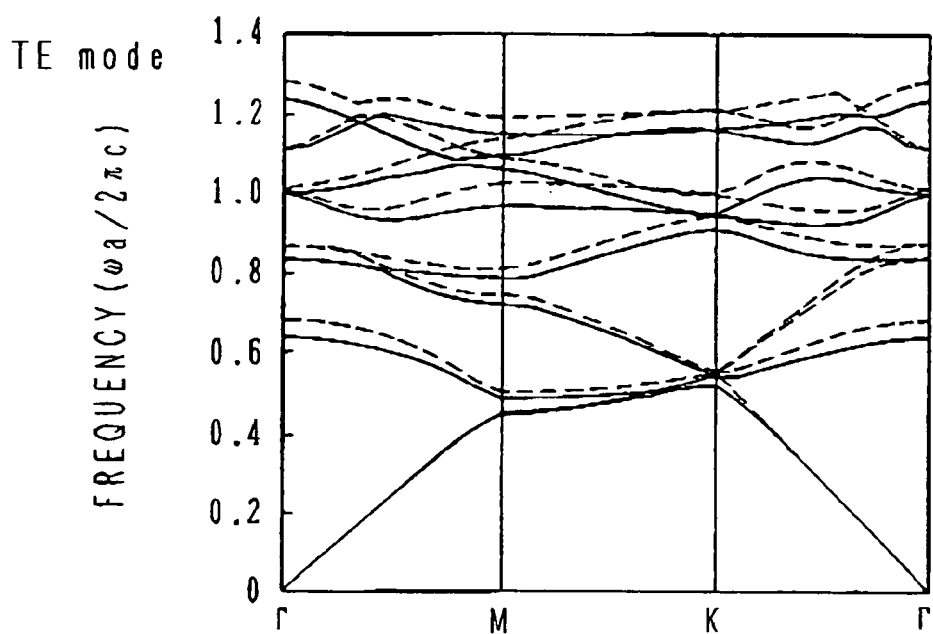
FIGS. 5A and 5B are graphs showing the photonic band structure of photonic crystals of the optical function device of the first embodiment.
Figure 5B:
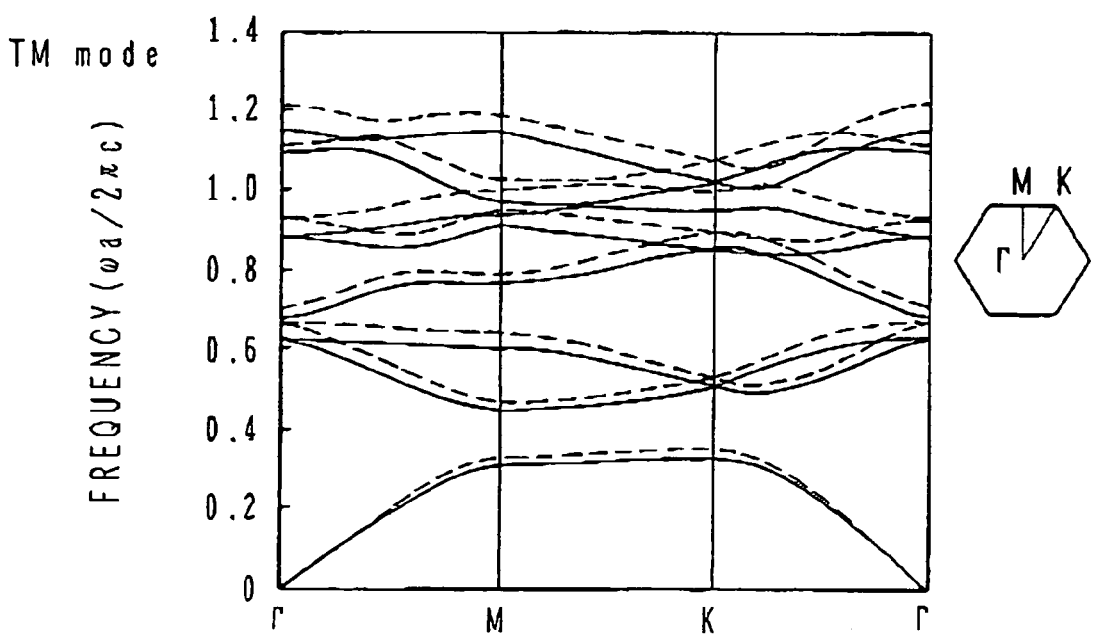

FIGS. 5A and 5B show the photonic band structures of light in the TE mode and TM mode. An equilateral hexagon shown to the right of FIG. 5B represents a Brillouin zone of an inverse lattice space of a two-dimensional triangle lattice. Γ, M and K of the Brillouin zone correspond to Γ, M and K on the abscissas of FIGS. 5A and 5B. M and K which are points on the zone outside the Brillouin zone are represented in some cases by J and X, respectively. The 20 ordinates of FIGS. 5A and 5B represent a frequency ($\omega a/2\pi c$) normalized by the period, where a is an alignment period of the column structure and c is a light velocity.

Solid lines in FIGS. 5A and 5B show the band structure with no applied voltage, and broken lines show the band structure with an applied voltage of 10 V. These band structures are for the ferroelectric columns 4 made of PLZT and having a diameter of 300 nm and a triangle lattice period of 600 nm.

Description will be directed on the results of converting the expected first band gap into a wavelength when light is propagated along the Γ-M direction. For light in the TE mode, the band gap is 1233 nm to 1345 nm when no voltage is applied, whereas it is 1199 nm to 1327 nm when a voltage of 10 V is applied. For light in the TM mode, the band gap is 1308 nm to 1918 nm when no voltage is applied, whereas it is 1261 nm to 1799 nm when a voltage of 10 V is applied. It is thus possible to change the band gap by changing an applied voltage. By applying a voltage across the lower electrode 2 and upper electrode 7 of the optical function device of the first embodiment shown in FIG. 1, the refractive index of the ferroelectric columns 4 can be changed.

As light is made incident upon the core layer 10 from the end face of the optical function device of the first embodiment, the light propagates through the core layer 10 having a high effective refractive index. The light components having a wavelength in the band gap cannot propagate through the core layer 10. Therefore, only the light having a wavelength outside of the band gap is output from the opposite end face. By changing the band gap, the spectrum of output light changes. Namely, the optical function device of the first embodiment functions as a variable wavelength optical filter.

Figure 6:
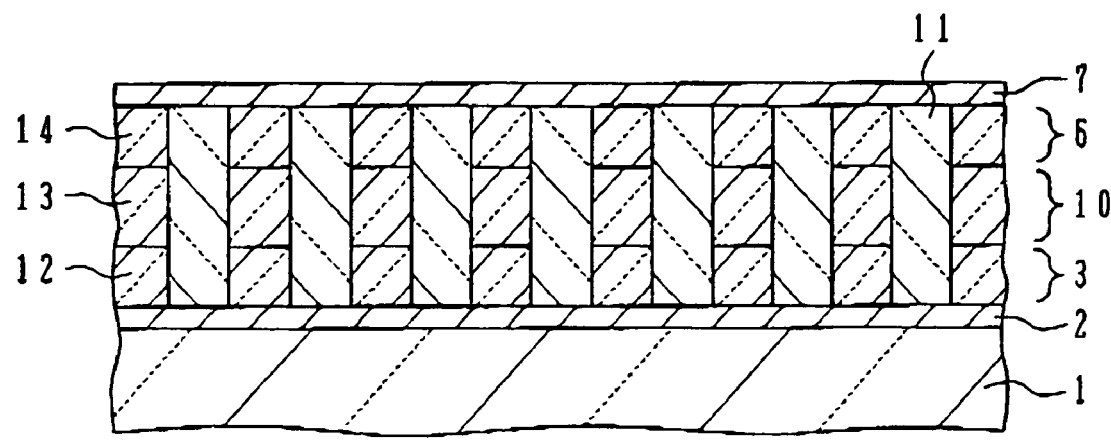
FIG. 6 is a cross sectional view of an optical function device according to a second embodiment.

FIG. 6 is a cross sectional view of an optical function device according to the second embodiment. The structures of a substrate 1, a lower electrode 2 and an upper electrode 7 are similar to those of the first embodiment. In the first embodiment, each of the lower clad layer 3 and upper clad layer 6 is a single layer made of dielectric substance, as shown in FIG. 1. In the second embodiment, each of a lower clad layer 3 and an upper clad layer 6 has the periodical structure that a refractive index distribution changes periodically, similar to a core layer 10.

As shown in FIG. 6, ferroelectric columns 11 made of PLZT are formed through the three layers, the lower clad layer 3, core layer 10 and upper clad layer 6. Similar to the first embodiment, the ferroelectric columns 11 are disposed at in-plane cross points of a triangle lattice.

A lower filler 12, a core layer filler 13 and an upper filler 14 are filled in between the ferroelectric columns 11. The lower filler 12, core layer filler 13 and upper filler 14 are disposed in the lower clad layer 3, core layer 10 and upper clad layer 6, respectively. The filler 12 in the lower clad layer 3 and the filler 14 in the upper clad layer 6 are made of $SiO_2$, and the filler 13 in the core layer 10 is made of MgO. Since the refractive index of MgO is higher than that of $SiO_2$, the effective refractive index of the core layer 10 becomes higher than the effective refractive indices of the lower clad layer 3 and upper clad layer 6.

With reference to FIGS. 7A to 7F, description will be made on a method of manufacturing the optical function device of the second embodiment.

Figure 7A:
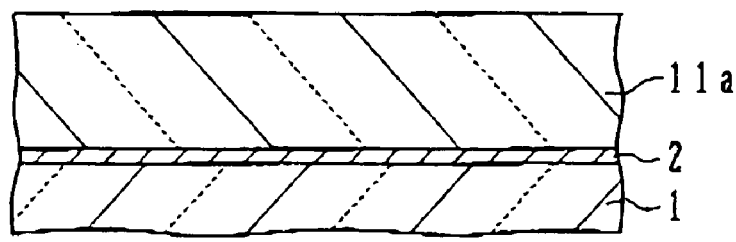
FIGS. 7A to 7F are cross sectional views illustrating a manufacture method for the optical function device of the second embodiment.

As shown in FIG. 7A, a lower electrode 2 is formed on a substrate 1. On the lower electrode 2, a PLZT film 11a having a thickness of 4 µm is formed by sputtering, pulse laser vapor deposition, sol-gel method, metal organic chemical vapor deposition (MOCVD) or the like.

Figure 7B:
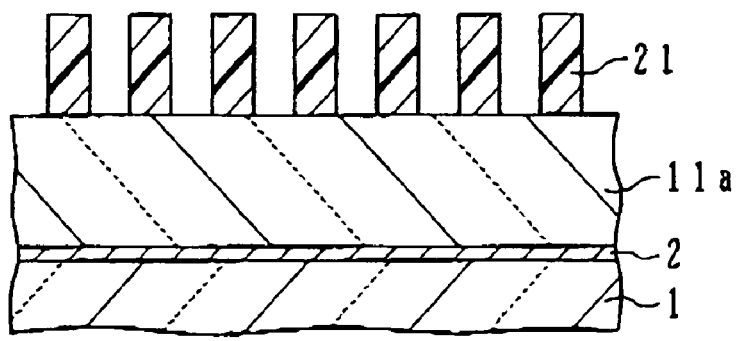

As shown in FIG. 7B, on the PLZT film 11a, a resist pattern 21 is formed through direct drawing of a pattern with an electron beam. The resist pattern 21 has a pattern corresponding to the ferroelectric columns 11 shown in FIG. 6. By using the resist pattern as an etching mask, the PLZT film 11a is dry-etched by using $CF_4$, $SF_6$ or the like as etching gas.

Figure 7C:
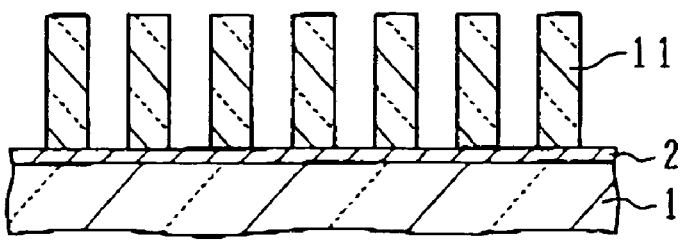

As shown in FIG. 7C, cylindrical ferroelectric columns 11 are left. The resist pattern 21 is removed thereafter.

Figure 7D:
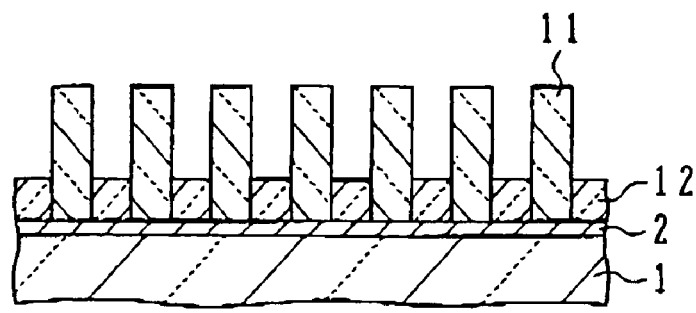
Figure 7E:
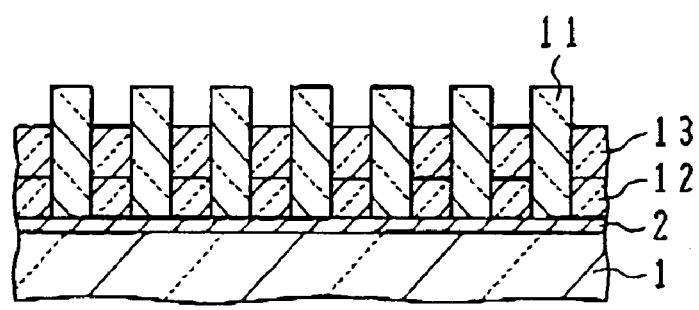
Figure 7F:
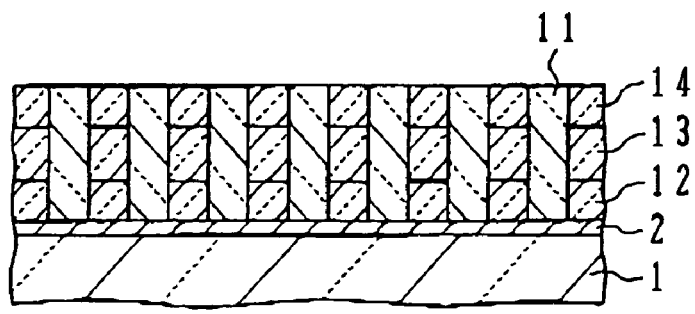

As shown in FIG. 7D, precursor solution of $SiO_2$ is spin-coated to fill in the lower filler 12 of $SiO_2$ between the ferroelectric columns 11. As shown in FIG. 7E, precursor solution of MgO is spin-coated to fill in the core layer filler 13 of MgO between the ferroelectric columns 11. As shown in FIG. 7F, precursor solution of $SiO_2$ is spin-coated to fill in the upper filler 14 of $SiO_2$ between the ferroelectric columns 11. The amount of the fillers and the number of revolutions of the substrate during spin coating are controlled to make the upper surface of the upper filler 14 flush with the upper surfaces of the ferroelectric columns 11.

An upper electrode 7 is formed on the ferroelectric columns 11 and upper filler 14, as shown in FIG. 6.

Similar to the first embodiment, the optical function device of the second embodiment can be used as a variable wavelength optical filter.

Figure 8:
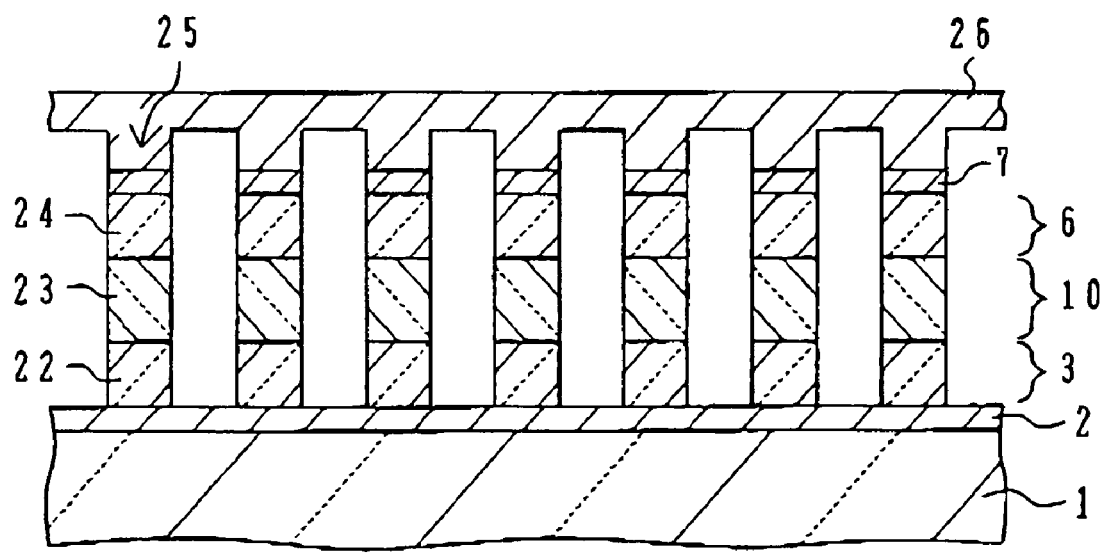
FIG. 8 is a cross sectional view of an optical function device according to a third embodiment.

FIG. 8 is a cross sectional view of an optical function device according to the third embodiment. On a substrate 1, a lower electrode 2 is formed having a thickness of 200 nm. On the lower electrode 2, a plurality of cylindrical members 25 are disposed. The cylindrical members 25 are disposed at cross points of a triangle lattice, similar to the ferroelectric columns 4 of the optical function device of the first embodiment shown in FIG. 1.

Each of the cylindrical members 25 has the four-layer structure that a lower clad member 22 which is made of MgO and is 1 µm thick, a ferroelectric member 23 which is made of PLZT and is 2 µm thick, an upper clad member 24 which is made of MgO and is 1 µm thick and an upper electrode 7 of 200 nm in thickness are stacked in this order from the substrate side. The spaces between the cylindrical members 25 are filled with air for example.

The periodically distributed lower clad members 22 and air constitute a lower clad layer 3. Similarly, the ferroelectric members 23 and air constitute a core layer 10, and the upper clad members 24 and air constitute an upper clad layer 6. The dispersively distributed upper electrodes 7 are electrically connected by a Pt film 26 for example.

The effective refractive index of the core layer 10 is higher than the effective refractive indices of the lower clad layer 3 and upper clad layer 6.

Figure 9A:
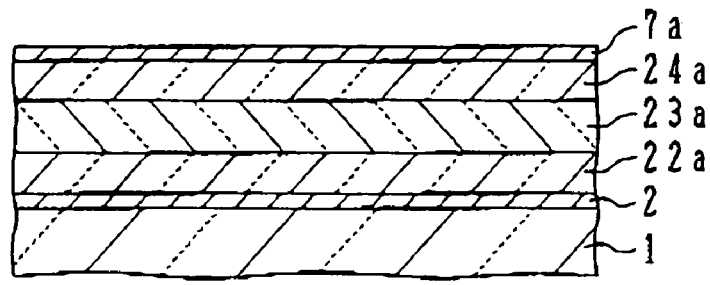
FIGS. 9A to 9C are cross sectional views illustrating a manufacture method for the optical function device of the third second embodiment.
Figure 9B:
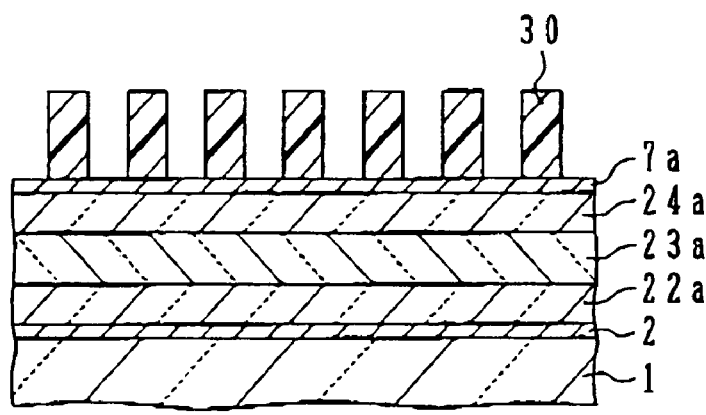
Figure 9C:
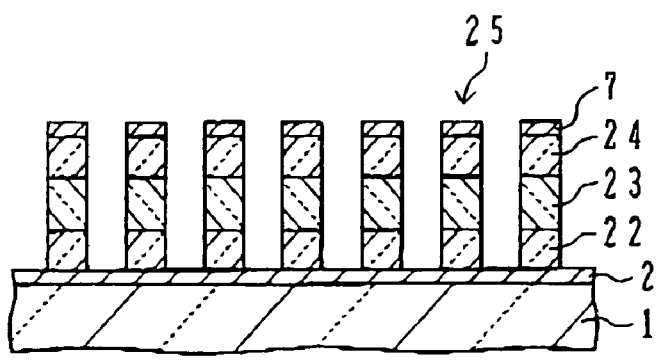

With reference to FIGS. 9A to 9C, description will be made on a method of manufacturing the optical function device of the third embodiment.

As shown in FIG. 9A, on an STO substrate 1, a lower electrode 2 is formed. On the lower electrode 2, an MgO layer 22a, a PLZT layer 23a and an MgO layer 24a are formed. These layers are deposited by sputtering, pulse laser vapor deposition, sol-gel method, MOCVD or the like. A Pt layer 7a is formed on the MgO layer 24a by sputtering.

As shown in FIG. 9B. a resist pattern 30 is formed on the Pt layer 7a. The resist pattern 30 has a pattern corresponding to the cylindrical members 25 shown in FIG. 8. For example, the resist pattern 30 can be formed through direct drawing of a pattern with an electron beam.

By using the resist pattern 30 as an etching mask, the layers from the Pt layer 7a to the upper surface of the lower electrode 2 are etched. Etching gas may be $CF_4$, $SF_6$ or the like. After this etching, the resist pattern 30 is removed.

As shown in FIG. 9C, cylindrical members 25 are left each having the lamination structure of a lower clad member, 22 made of a portion of the MgO layer 22a, a ferroelectric member 23 made of a portion of the PLZT layer 23a, an upper clad member 24 made of a portion of the MgO layer 24a and an upper electrode 7 made of a portion of the Pt layer 7a.

A resist film having a thickness of 10 µm is deposited burying the cylindrical members 25. After the surface of the resist film is planarized by polishing, openings are formed in areas corresponding to the cylindrical members 25 to expose the upper surfaces of the cylindrical members. Thereafter, a Pt film is formed on the resist film by electroless plating, sputtering or the like, the openings of the resist film being filled with the Pt film.

The resist film is thereafter removed. As shown in FIG. 8, the Pt film 26 is therefore formed which has a cylindrical region extending upward from each of the cylindrical members 25 and a film region connecting the cylindrical regions at their upper surfaces.

Similar to the first embodiment, the optical function device of the third embodiment can be used as a variable wavelength optical filter.

Figure 10:
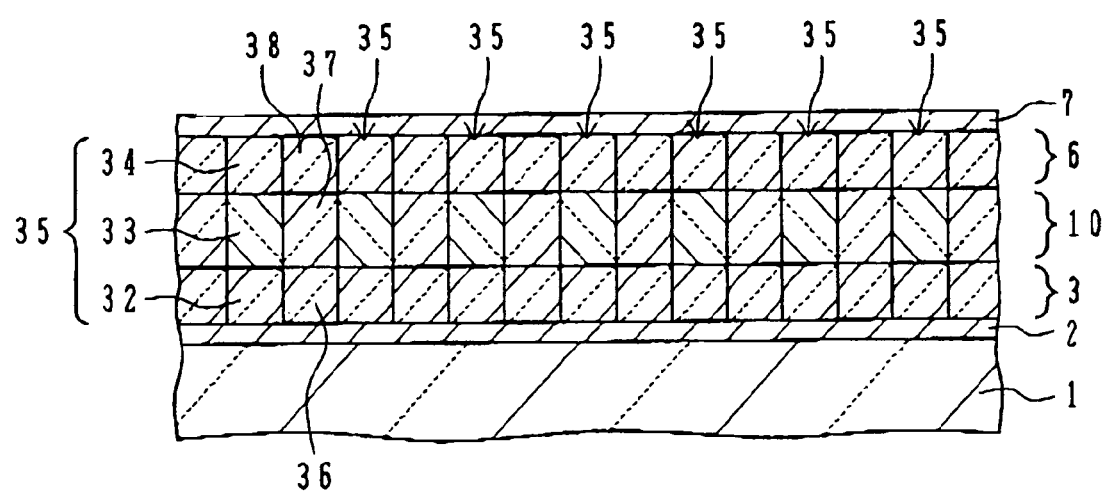
FIG. 10 is a cross sectional view of an optical function device according to a fourth embodiment.

FIG. 10 is a cross sectional view of an optical function device according to the fourth embodiment. On an STO substrate 1, a lower electrode 2 is formed. On the lower electrode 2, a plurality of cylindrical members 35 are disposed. Each of the cylindrical members 35 has the three-layer structure of a lower clad member 32 which is made of MgO and is 1 µm thick, a ferroelectric member 33 which is made of PLZT and is 2 µm thick and an upper clad member 34 which is made of MgO and is 1 µm thick. Similar to the cylindrical members 25 shown in FIG. 8, the cylindrical members 35 are disposed at cross points of a triangle lattice.

The spaces between the cylindrical members 35 are filled with a filler. The filler has the three-layer structure of a lower filler 36 of $SiO_2$ having a thickness of 1 µm, a core layer filler 37 of MgO having a thickness of 2 µm and an upper filler 38 of $SiO_2$ having a thickness of 1 µm.

The lower clad members 32 and lower filler 36 constitute a lower clad layer 3. The ferroelectric members 33 and core layer filler 37 constitute a core layer 10. The upper clad members 34 and upper filler 38 constitute an upper clad layer 6. The effective refractive index of the core layer 10 is higher than the effective refractive indices of the lower clad layer 3 and upper clad layer 6. An upper electrode 7 is formed on the cylindrical members 35 and upper filler 38.

Figure 11A:
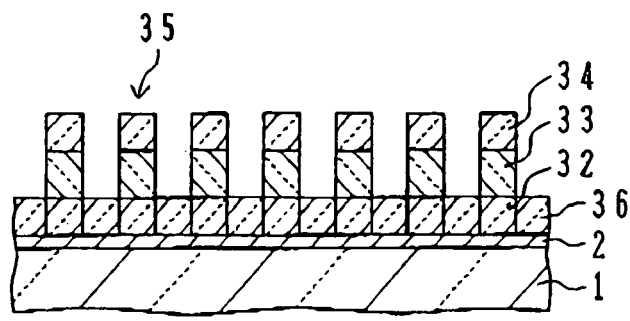
FIGS. 11A to 11C are cross sectional views illustrating a manufacture method for the optical function device of the fourth second embodiment.
Figure 11B:
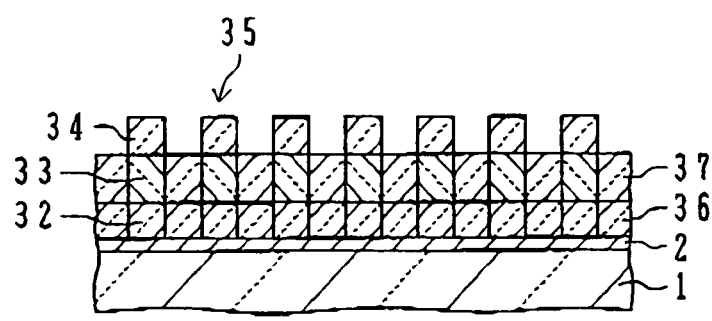
Figure 11C:
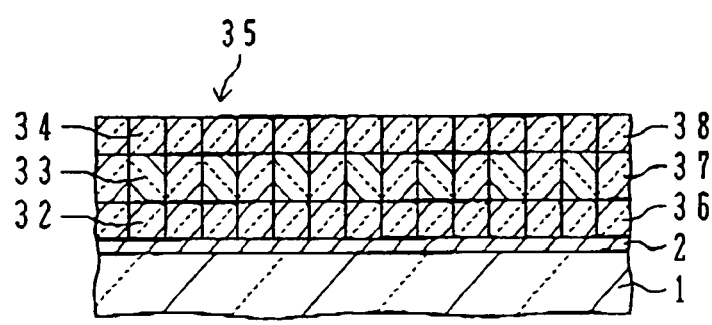

With reference to FIGS. 11A to 11C, description will be made on a method of manufacturing the optical function device of the fourth embodiment.

As shown in FIG. 11A, on a substrate 1, a lower electrode 2 is formed. On the lower electrode 2, cylindrical members 35 are formed. The cylindrical members 35 can be formed by a method similar to the method of forming the cylindrical members 25 of the third embodiment shown in FIGS. 9A to 9C. The fourth embodiment does not form, however, the upper electrode 7 as the uppermost layer of the cylindrical member 25 of the third embodiment. The spaces between the cylindrical members 35 are filled with a filler 36 made of MgO.

As shown in FIG. 11B, the spaces between the cylindrical members 35 are further filled with a core layer filler 37. As shown in FIG. 11C, the spaces between the cylindrical members 35 are further filled with an upper filler 38. These fillers can be formed by a method similar to the method of forming the fillers of the second embodiment shown in FIGS. 7D to 7F.

An upper electrode 7 is formed on the cylindrical members 35 and upper filler 38 as shown in FIG. 10.

Similar to the first embodiment, the optical function device of the fourth embodiment can be used as a variable waveform optical filter.

In the first to fourth embodiments, although PLZT is used as the ferroelectric material which changes its refractive index upon voltage application (electric field generation), other materials presenting the electrooptical effect may be used. Such materials may be $KH_2PO_4$ (KDP) of the tetragonal system, $LiNbO_3$ and $LiTaO_3$ of the ilmenite structure, $BaTiO_3$, $Pb(Zr, Ti)O_3$ (PZT), $(Pb, La)TiO_3$ (PLT) of the perovskite structure, $(Sr, Ba)Nb_2O_6$ (SBN) of the tungsten bronze structure, and the like.

Although MgO, STO, $SiO_2$ and the like are used as the material of the lower clad layer 3 and upper clad layer 6, other transparent dielectric materials may be used. The material of the clad layer may be selected from the above-described ferroelectric materials. For example, the lower clad member 32 and upper clad member 34 of the optical function device of the fourth embodiment shown in FIG. 10 may be made of ferroelectric material having a refractive index lower than that of the ferroelectric member 33 of the core layer 10.

The materials of the core layer and upper and lower clad layers are required to be selected in such a manner that the effective refractive index of the core layer becomes higher than that of the clad layers. With a combination of such materials, light can be confined in the core layer.

In the first to fourth embodiments, cylindrical members of the core layer is made of photonic crystals disposed at cross points of a triangle lattice. Instead of the cylindrical members, other members may also bemused having shapes of a rectangular prism, a triangular prism, an ellipsoidal prism and the like. A layout pattern is not limited only to a triangle lattice, but other periodical two-dimensional patterns may be used. For example, a two-dimensional square lattice pattern or a two-dimensional honeycomb lattice pattern may be used. The layout pattern may be a pattern having a one-dimensional periodical structure. For example, a periodical pattern having cylinders, circular holes or the like disposed in line may be used. In this case, light is propagated along the disposed direction.

Figure 12A:
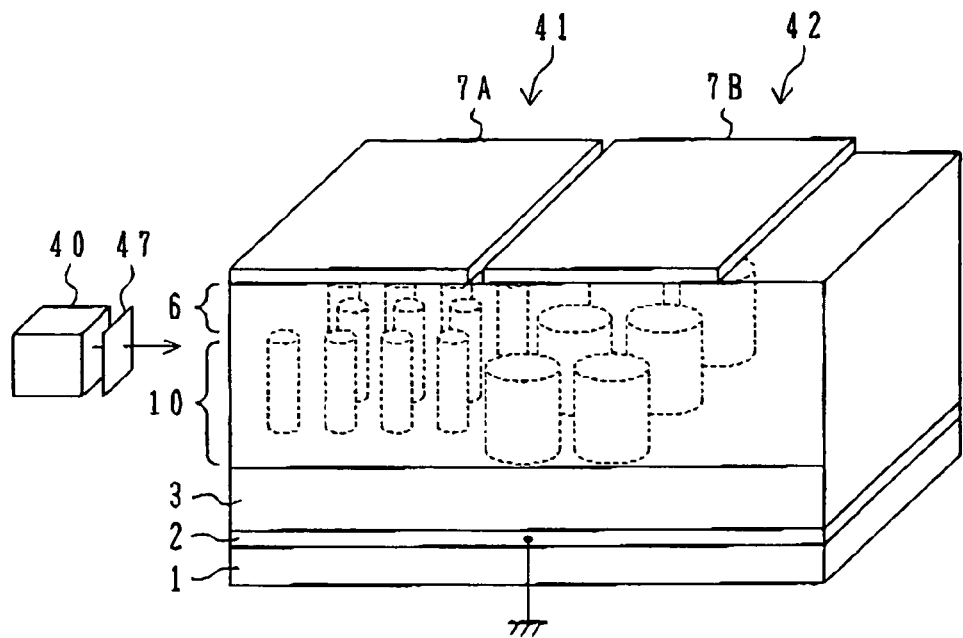
FIGS. 12A and 12B a perspective view and a plan cross sectional view of a variable wavelength light source according to a fifth embodiment.
Figure 12B:
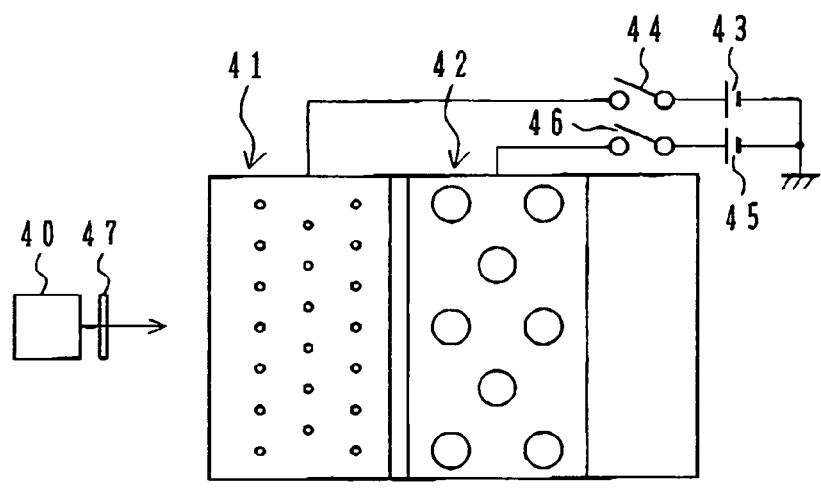
Figure 12B:
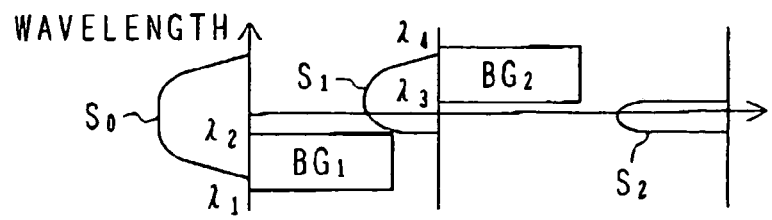

FIG. 12A is a schematic perspective view of a variable wavelength light source according to the fifth embodiment, and FIG. 12B is a schematic plan cross sectional view of the light source.

The variable wavelength light source of the fifth embodiment comprises a laser light source 40, a first variable wavelength optical filter 41 and a second variable wavelength optical filter 42. The first and second variable wavelength optical filters 41 and 42 have the structure similar to that of the optical function device of the first to fourth embodiments. The two variable wavelength optical filters are formed on the same substrate 1. The laser light source 40 is a semiconductor laser for example.

A laser beam radiated from the laser light source 40 becomes incident upon the first variable wavelength optical filter 41. The laser beam incident upon the first variable wavelength optical filter 41 propagates through the inside of the filter and thereafter propagates through the inside of the second variable wavelength optical filter 42 and is output to the external.

A lower electrode 2 is grounded. A variable voltage source 43 applies a voltage to an upper electrode 7A of the first variable wavelength optical filter 41 via a switch 44. Another variable voltage source 45 applies a voltage to an upper electrode 7B of the second variable wavelength optical filter 42 via a switch 46. The switches 44 and 46 are made of transistors for example.

The period of the refractive index distribution of photonic crystals constituting a core layer 10 of the first variable wavelength optical filter 41 is different from the period of the refractive index distribution of photonic crystals constituting a core layer 10 of the second variable wavelength optical filter 42. Therefore, the band gaps of both the filters are also different.

The lower diagram in FIG. 12B shows the spectra of a laser beam radiated from the laser light source 40 and propagating through the first and second variable wavelength optical filters 41 and 42. The abscissa corresponds to the propagation direction of a laser beam and the ordinate represents a wavelength. It is now assumed that the band gap $BG_1$ of the first variable wavelength optical filter 41 is in the range from a wavelength $\lambda_1$ to a wavelength $\lambda_2$ and the band gap $BG_2$ of the second variable wavelength optical filter 42 is in the range from a wavelength $\lambda_3$ to a wavelength $\lambda_4$. The relation of $\lambda_1<\lambda_2<\lambda_3<\lambda_4$ is satisfied. The spectrum $S_0$ of a laser beam radiated from the laser light source 40 covers the wavelengths contained in the band gap $BG_1$ to the wavelengths contained in the band gap $BG_2$.

Since light in the range between the wavelengths $\lambda_1$ and $\lambda_2$ cannot transmit through the first variable wavelength optical filter 41, the spectrum $S_1$ of the laser beam output from the first variable wavelength optical filter 41 is narrowed to the range between the wavelengths $\lambda_2$ and $\lambda_4$. Similarly, the spectrum $S_2$ of the laser beam output from the second variable wavelength optical filter 42 is narrowed to the range between the wavelengths $\lambda_2$ and $\lambda_3$.

As the voltages applied to the first and second variable wavelength optical filters 41 and 42 are changed, the upper limit wavelength $\lambda_2$ of the band gap $BG_1$ and the lower limit wavelength $\lambda_3$ of the band gap $BG_2$ are changed. The wavelength of the laser beam output from the second variable wavelength optical filter 42 changes accordingly. A variable wavelength light source can therefore be obtained from a combination of the laser light source 40 and first and second variable wavelength optical filters 41 and 42.

Figure 12C:
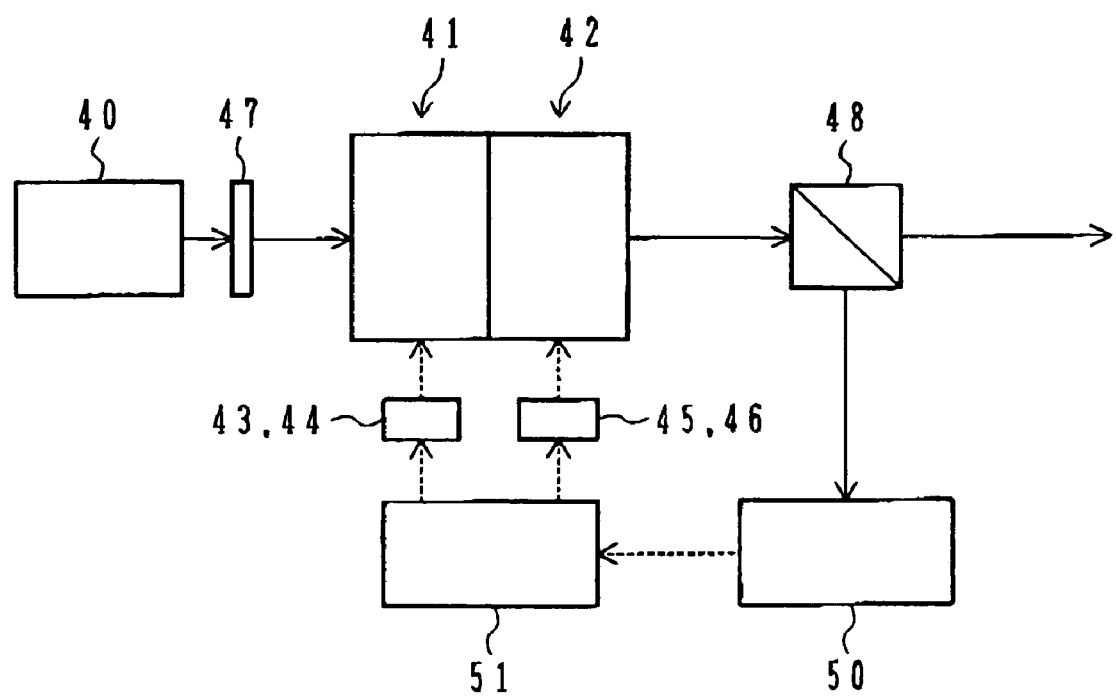
FIG. 12C is a block diagram illustrating a method of controlling a wavelength.

With reference to FIG. 12C, description will be made on a method of controlling a wavelength. A portion of a laser beam passed through the variable wavelength filters 41 and 42 is branched by a beam splitter 48 and becomes incident upon a multi-channel analyzer 50. The multi-channel analyzer 50 measures the spectrum of input light.

The obtained spectrum information is input to a controller 51. The controller 51 calculates the wavelength of light having a peak spectrum waveform and a half band width of the light, and obtains a difference between the wavelength of the light having the peak spectrum waveform and a desired wavelength and a difference between the half band width and a desired half band width. The variable voltage sources 43 and 45 are controlled to make the differences small and change the voltages applied to the variable wavelength filters 41 and 42. In this manner, it becomes possible to obtain a laser beam having a desired center wavelength and a desired wavelength spread.

A variable wavelength optical band-pass filter can be obtained from a combination of the first and second variable wavelength optical filters 41 and 42. By using a variable wavelength optical band-pass filter, a desired optical signal can be picked up and monitored among optical signals having different wavelengths in a WDM communication system for example.

A variable wavelength optical band-pass filter is effective for realizing an optical add/drop multiplexing (OADM). For example, since the wavelength can be changed continuously, limited wavelength resources can be used efficiently. An optical network can be configured which allows frequent expansions and reconfigurations meeting various demands.

The variable wavelength light source of the fifth embodiment does not use mechanical drive structures and can change a wavelength at high speed. The system can be configured more compact than installing a plurality of laser oscillators having different oscillation wavelengths.

With reference to FIG. 13 and FIGS. 14A to 14E, an optical function device according to a sixth embodiment will be described.

Figure 13:
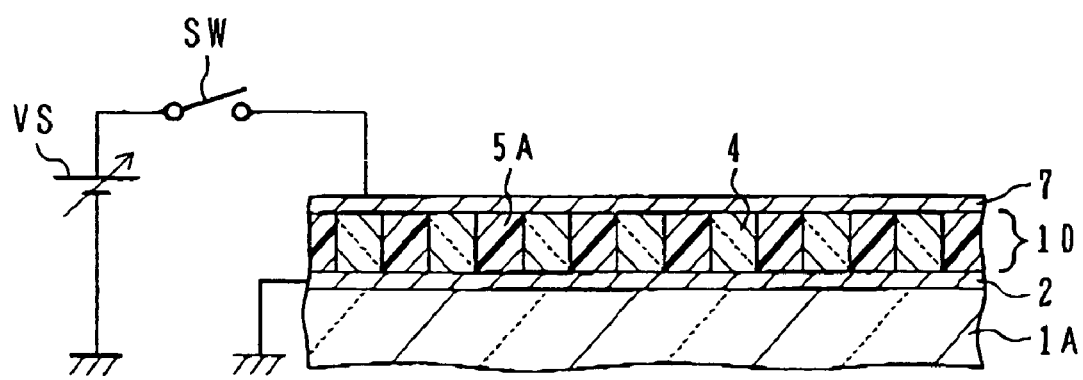
FIG. 13 is a cross sectional view of an optical function device according to a sixth embodiment.

FIG. 13 is a cross sectional view of an optical function device according to a sixth embodiment. A lower electrode 2 is formed on a substrate 1A. The sixth embodiment does not use the lower clad layer 3 of the optical function device of the first embodiment shown in FIG. 1, and a core layer 10 is formed directly on the lower electrode 2. Similarly, the upper clad layer 6 is not disposed, and an upper electrode 7 is formed directly on the core layer 10. The substrate 1A is made of, for example, single crystal MgO. The lower electrode 2 and upper electrode 7 are made of metal such as Pt or conductive oxide such as SRO.

The core layer 10 is constituted of ferroelectric columns 4 and a filler 5A. Similar to the optical function device of the first embodiment shown in FIG. 1, the ferroelectric columns 4 are disposed periodically along the two-dimensional directions to form photonic crystals. The filler 5A is filled in between the ferroelectric columns 4. The ferroelectric column 4 is made of, for example, PLZT. The filler 5A is made of material softer than the ferroelectric column 4, such as fluorine polyimide and polysilane. The filler 5A is made of material which is transparent in the wavelength range of a laser beam incident upon the core layer constituting photonic crystals.

The lower electrode 2 is grounded, and a variable voltage source VS applies voltage to the upper electrode 7. A switch SW is inserted into the voltage application circuit.

Figure 14A:
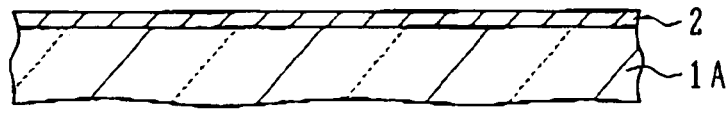
FIGS. 14A to 14E are cross sectional views of the device during manufacture, illustrating a manufacture method for the optical function device of the sixth embodiment.

With reference to FIGS. 14A to 14E, description will be made on a method of manufacturing the optical function device of the sixth embodiment. As shown in FIG. 14A, on a substrate 1A made of single crystal MgO and exposing the (001) plane, a lower electrode 2 is formed which is made of Pt and having a thickness of 200 nm. For example, the lower electrode 2 can by formed by RF magnetron sputtering under the condition of a substrate temperature of 600° C. Under this condition, Pt is epitaxially grown on the MgO substrate.

Figure 14B:
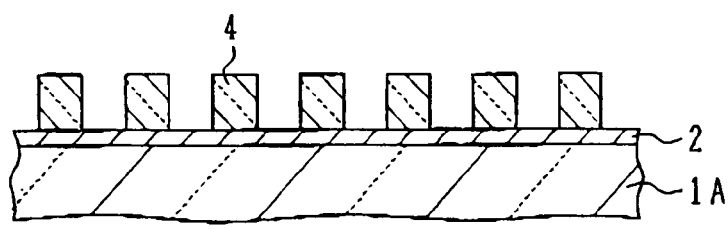

As shown in FIG. 14B, ferroelectric columns 4 are formed on the lower electrode 2 by the method similar to that of the first embodiment described with reference to FIGS. 2B and 2C. In the sixth embodiment, the height of the ferroelectric column 4 is set to 1.8 μm. In the first embodiment, although the baking temperature is set to 725° C., this temperature may be set to 700° C.

Figure 14C:
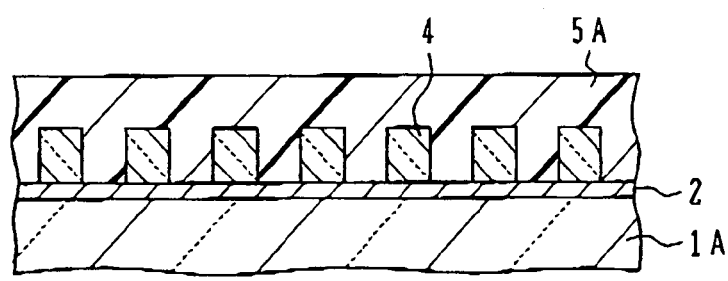

As shown in FIG. 14C, fluorine polyimide is spin-coated covering the ferroelectric columns 4 to form a coating film 5A. Fluorine polyimide is filled in between (in the space between) the ferroelectric columns 4 and a fluorine polyimide film is formed on the ferroelectric columns 4.

Figure 14D:
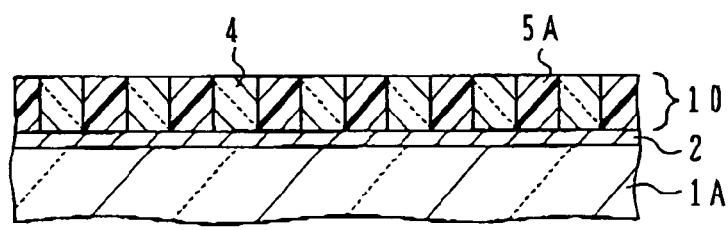

As shown in FIG. 14D, the upper layer of the coating film 5A is removed until the upper surfaces of the ferroelectric columns 4 are exposed. For example, dry etching such as reactive ion etching (RIE) and polishing such as chemical mechanical polishing (CMP) may be used. The filler 5A made of fluorine polyimide is left between the ferroelectric columns 4. The core layer 10 is constituted of the ferroelectric columns 4 and filler 5A.

Figure 14E:
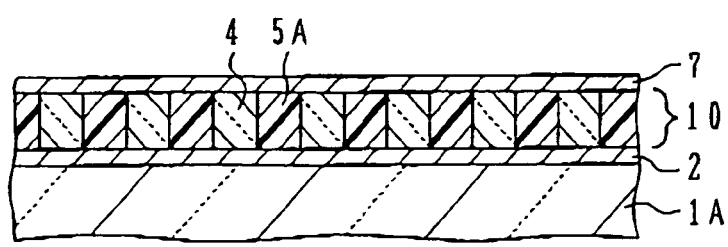

As shown in FIG. 14E, an upper electrode 7 made of Pt, SRO or the like and having a thickness of 200 nm is formed on the core layer 10 by sputtering or laser vapor deposition.

In the sixth embodiment, the ferroelectric columns 4 extend from the bottom to top surface of the core layer 10, the lower electrode 2 contacts the bottoms of the ferroelectric columns 4 and the upper electrode 7 contacts the tops of the ferroelectric columns 4. As compared to inserting the insulating material such as a clad layer between the electrodes and ferroelectric columns, an electric field in the ferroelectric columns can be made strong. It is therefore possible to move the band gap position of the photonic crystals along the waveform axis direction at a lower voltage.

As an electric field is generated in the ferroelectric columns 4, the height of the ferroelectric columns 4 changes due to the piezoelectric phenomenon. Since the filler 5A used in the sixth embodiment is softer than the ferroelectric columns 4, the filler 5A does not hinder the expansion and contraction of the ferroelectric columns 4. It is therefore possible to make large a change in a refractive index during voltage application. The material of the filler 5A is preferably transparent or less absorptive in the waveform range of the band gap of photonic crystals. For example, fluorine polyimide or polysilane may be used as the material of the filler in order to form photonic crystals for wavelength control in a 1.55 μm band.

The material softer than the ferroelectric material constituting the core layer 10 may be used as the material of the filler 5 of the optical function device of the first embodiment shown in FIG. 1, as the material of the filler 13 of the optical function device of the second embodiment shown in FIG. 6, and as the material of the filler 37 of the optical function device of the fourth embodiment shown in FIG. 10.

Figure 15:
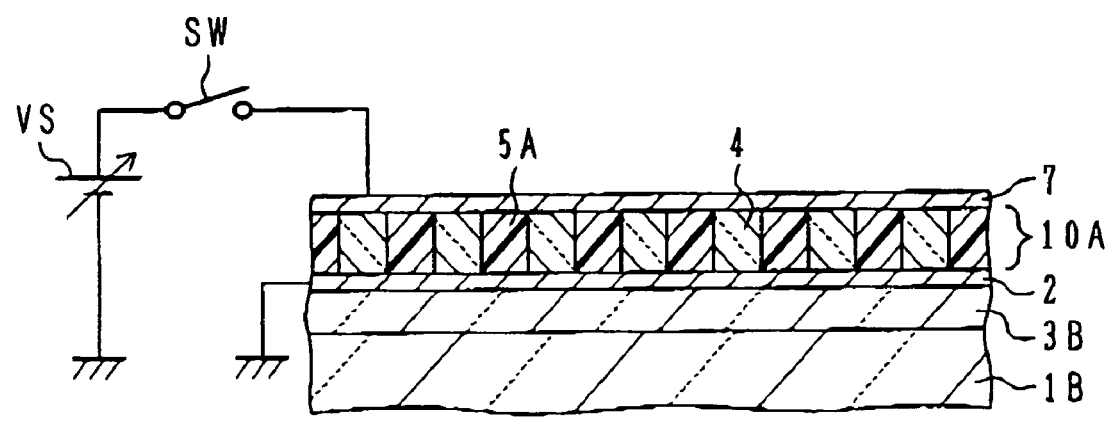
FIG. 15 is a cross sectional view of an optical function device according to a sixth embodiment.

FIG. 15 is a cross sectional view of an optical function device according to a seventh embodiment. A lower clad layer 3B made of MgO and having a thickness of 1 μm is formed on a substrate 1B made of silicon. The upper structure than the lower clad layer 3B is similar to the structure from the lower electrode 2 to upper electrode 7 of the optical function device of the sixth embodiment shown in FIG. 13.

Next, description will be made on a method of manufacturing the optical function device of the seventh embodiment. On the single crystal substrate 1B, an MgO film to be used as the lower clad layer 3B is epitaxially grown by pulse laser vapor deposition under the condition of a substrate temperature of 450° C. The method of forming the layers from the lower electrode 2 to upper electrode 7 is similar to that of the sixth embodiment.

As the material of the substrate 1, materials allowing MgO to epitaxially grow may be used in addition to silicon. For example, GaAs might be used as the material of the substrate 1.

In the sixth embodiment, photonic crystals can be formed without using an MgO single crystal substrate. Since it is not necessary that the substrate 1A provides a clad layer function, the selection range of materials of the substrate 1A can be broadened.

The optical function device of the sixth or seventh embodiment can be used as the variable wavelength filters 41 and 42 of the variable wavelength light source of the fifth embodiment shown in FIGS. 12A to 12C.

In the first to seventh embodiments described above, it is preferable to orient the photonic crystals of the ferroelectric columns 4 in such a manner that the directions of one of the (001), (110) and (111) planes are uniform. The directions of the crystal plane can be aligned by growing the ferroelectric columns 4 in such a manner than the crystal plane is made parallel to the substrate surface.

As ferroelectric columns are epitaxially grown by using a single crystal MgO substrate exposing the (001) plane, the (001) plane of the ferroelectric columns becomes parallel to the surface of the substrate 1.

When the MgO substrate exposing the (110) plane, the (110) plane of the ferroelectric columns becomes parallel to the surface of the substrate 1. When the MgO substrate exposing the (111) plane, the (111) plane of the ferroelectric columns becomes parallel to the surface of the substrate 1.

Ferroelectric material, crystal planes of which are uniform, have better electrical and optical property than ferroelectric material, the directions of the crystal planes of which are random, for example, larger remanence, less fatigue by polarization reversal, less leakage current, less propagation loss of light, larger electro-optical effect.

The present invention has been described in connection with the preferred embodiments. The invention is not limited only to the above embodiments. It will be apparent to those skilled in the art that other various modifications, improvements, combinations, and the like can be made.

What we claim are:

1. An optical function device comprising:
   a core layer containing photonic crystals formed by ferroelectric members made of a ferroelectric substance and periodically disposed along a one-dimensional direction or two-dimensional directions;
   electrodes for applying an electric field to the core layer; and
   a clad layer disposed on both sides of the core layer containing photonic crystals formed by ferroelectric members made of a ferroelectric substance and periodically disposed along a one-dimensional direction or two-dimensional directions, wherein an effective refractive index of said clad layer is smaller than an effective refractive index of said core layer.

2. An optical function device according to claim 1, wherein polarization axes of the ferroelectric members in the core layer stand upright along a thickness direction of the core layer.

3. An optical function device according to claim 1, further comprising a clad layer disposed on both sides of the core layer and sandwiching the core layer, an effective refractive index of the clad layer being smaller than an effective refractive index of the core layer.

4. An optical function device according to claim 3, wherein the clad layer has a periodical structure having regions of different refractive indices disposed periodically.

5. An optical function device according to claim 1, wherein the ferroelectric members constituting the core layer are oriented in such a manner that directions of one of the (001), (110) and (111) planes of the ferroelectric members are uniform.

6. An optical function device comprising:
   a core layer containing photonic crystals formed by ferroelectric members made of a ferroelectric substance and periodically disposed along a one-dimensional direction or two-dimensional directions;
   electrodes for applying an electric field to the core layer; and
   a clad layer disposed on both sides of the core layer and sandwiching the core layer, an effective refractive index of the clad layer being smaller than an effective refractive index of the core layer,
   wherein the clad layer contains photonic crystals formed by ferroelectric members made of a ferroelectric substance and periodically disposed along a one-dimensional direction or two-dimensional directions.

7. An optical function device according to claim 6, wherein the ferroelectric members of the core layer and the ferroelectric members of the clad layers are made of a same ferroelectric substance and are homogeneous in terms of a crystal structure.

8. An optical function device according to claim 7, further comprising fillers filled in between the ferroelectric members of the clad layers and the core layer, wherein a refractive index of the filler in the core layer is higher than refractive indices of the fillers in the clad layers.

9. An optical function device according to claim 6, wherein a refractive index of the ferroelectric members in the core layer is higher than refractive indices of the ferroelectric members in the clad layers.

10. An optical function device according to claim 9, further comprising a filler filled in between the ferroelectric members of the clad layers and the core layer, wherein the fillers in the clad layers and the filler in the core layer are made of a same substance.

11. An optical function device according to claim 6, wherein the ferroelectric members in the core layer and the ferroelectric members in the clad layer are made of different ferroelectric substances, the optical function device further comprises a filler filled in between the ferroelectric members in the clad layer and core layer, and the fillers in the clad layers and the filler in the core layer are made of different substances.

12. A variable wavelength optical filter, comprising:
    a first optical filter; and
    a second optical filter upon which a laser beam transmitted through the first optical filter becomes incident,
    wherein each of the first and second optical filters comprises:
    a core layer containing photonic crystals formed by ferroelectric members made of a ferroelectric substance and periodically disposed along a one-dimensional direction or two-dimensional directions; and
    electrodes for applying an electric field to the core layer,
    and wherein band gaps of the photonic crystals of the first and second optical filters are apart from each other by a wavelength interval.

13. A variable wavelength optical filter according to claim 12, wherein an alignment period of the ferroelectric members of the first optical filter is different from an alignment period of the ferroelectric members of the second optical filter.

14. A variable wavelength light source comprising:
    a laser oscillator for radiating a laser beam having wavelength distributed in a range from a first wavelength to a second wavelength;
    a first optical filter upon which the laser beam radiated from the laser oscillator becomes incident; and
    a second optical filter upon which a laser beam transmitted through the first optical filter becomes incident,
    wherein each of the first and second optical filters comprises:
    a core layer containing photonic crystals formed by ferroelectric members made of a ferroelectric substance and periodically disposed along a one-dimensional direction or two-dimensional directions; and
    electrodes for applying an electric field to the core layer,
    and wherein band gaps of the photonic crystals of the first and second optical filters are apart from each others by a wavelength interval and partially overlap the range between the first wavelength and the second wavelength.

15. A variable wavelength light source according to claim 14, wherein an alignment period of the ferroelectric members of the first optical filter is different from an alignment period of the ferroelectric members of the second optical filter.

16. An optical function device comprising:
    a core layer including a first member disposed periodically along a one-dimensional direction or two-dimensional directions and a second member filled in between the first members, the first and second members constituting a photonic crystal, and at least one of the first and second members being made of a substance having a character that a refractive index is changed upon generation of an electric field;

electrodes for applying an electric field to the core layer; and a clad layer disposed on both sides of the core layer containing photonic crystals formed by ferroelectric members made of a ferroelectric substance and periodically disposed along a one-dimensional direction or two-dimensional directions, wherein an effective refractive index of said clad layer is smaller than an effective refractive index of said core layer.

17. An optical function device according to claim 16, wherein the first member is made of ferroelectric material having a piezoelectric effect and the second member is made of material softer than the first member.

18. An optical function device according to claim 16, wherein each of the ferroelectric members constituting the core layer extends from one surface to the other of the core layer, and the electrodes are disposed sandwiching the core layer and directly contact each of the ferroelectric members.

19. An optical function device according to claim 16, wherein the ferroelectric members constituting the core layer are aligned in such a manner that directions of one of (001), (110) and (111) planes of the ferroelectric members are uniform.

20. An optical function device according to claim 16, further comprising a clad layer disposed on both sides of the core layer and sandwiching the core layer, an effective refractive index of the clad layer being smaller than an effective refractive index of the core layer.

21. A variable wavelength optical filter comprising:
a first optical filter; and
a second optical filter upon which a laser beam transmitted through the first optical filter becomes incident,
wherein each of the first and second optical filters comprises:
a core layer including a first member disposed periodically along a one-dimensional direction or two-dimensional directions and a second member filled in between the first members, the first and second members constituting a photonic crystal, and at least one of the first and second members being made of a substance having a character that a refractive index is changed upon generation of an electric field; and
electrodes for applying an electric field to the core layer, and wherein band gaps of the photonic crystals of the first and second optical filters are apart from each other by a wavelength interval.

22. A variable wavelength optical filter according to claim 21, wherein an alignment period of the ferroelectric members of the first optical filter is different from an alignment period of the ferroelectric members of the second optical filter.

23. A variable wavelength light source comprising:
a laser oscillator for radiating a laser beam having wavelengths distributed in a range from a first wavelength to a second wavelength;
a first optical filter upon which the laser beam radiated from the laser oscillator becomes incident; and
a second optical filter upon which a laser beam transmitted through the first optical filter becomes incident,
wherein each of the first and second optical filters comprises:
a core layer including a first member disposed periodically along a one-dimensional direction or two-dimensional directions and a second member filled in between the first members, the first and second members constituting a photonic crystal, and at least one of the first and second members being made of a substance having a character that a refractive index is changed upon generation of an electric field; and
electrodes for applying an electric field to the core layer,
and wherein band gaps of the photonic crystals of the first and second optical filters are apart from each other by a wavelength interval and partially overlap the range between the first wavelength and the second wavelength.

24. A variable wavelength light source according to claim 23, wherein an alignment period of the ferroelectric members of the first optical filter is different from an alignment period of the ferroelectric members of the second optical filter.

25. A method of manufacturing ferroelectric members comprising the steps of:
forming a resist film on a substrate;
forming openings in the resist film, the openings being disposed periodically along a one-dimensional direction or two-dimensional directions;
filling precursor solution of a ferroelectric substance in the openings and drying the solution to form precursors;
removing the resist film; and
baking the precursors to form ferroelectric members.

* * * * *